(12) United States Patent
Kitagawa et al.

(10) Patent No.: US 7,725,317 B2
(45) Date of Patent: May 25, 2010

(54) INTERACTIVE CONTROL SYSTEM AND METHOD

(75) Inventors: Eiji Kitagawa, Kawasaki (JP);
Toshiyuki Fukuoka, Kawasaki (JP);
Ryosuke Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1041 days.

(21) Appl. No.: 10/890,205

(22) Filed: Jul. 14, 2004

(65) Prior Publication Data
US 2005/0192804 A1    Sep. 1, 2005

(30) Foreign Application Priority Data
Feb. 27, 2004    (JP) .............................. 2004-055294

(51) Int. Cl.
*G10L 15/00* (2006.01)
*G10L 11/00* (2006.01)
(52) U.S. Cl. ........................ 704/236; 704/231; 704/275
(58) Field of Classification Search ........................ None
See application file for complete search history.

(56) References Cited

U.S. PATENT DOCUMENTS 5,632,002 A * 5/1997 Hashimoto et al. .......... 704/231
6,253,176 B1 * 6/2001 Janek et al. .................. 704/231
6,778,975 B1 * 8/2004 Anick et al. .................... 707/1
2004/0148170 A1 * 7/2004 Acero et al. ................. 704/257

OTHER PUBLICATIONS

U.S. Appl. No. 10/766,928, filed Jan. 30, 2004, Toshiyuki Fukuoka et al., Fujitsu Limited.

* cited by examiner

*Primary Examiner*—David R Hudspeth
*Assistant Examiner*—Samuel G Neway
(74) *Attorney, Agent, or Firm*—Staas & Halsey LLP

(57) ABSTRACT

An interactive control system is disclosed with which the recognition rate and the responsiveness when operating a plurality of interactive services in parallel can be improved. A recognition lexicon and consolidated and reorganized information are generated for each individual interaction. Thus, excessive growth of the recognition lexicon can be avoided and a lowering of the recognition rate can be prevented. Moreover, based on the consolidated and reorganized information, it is possible to specify interactive services that may respond to the same input information, so that responses that are unexpected for the user can be prevented.

10 Claims, 12 Drawing Sheets

| IC | accepted term |
|---|---|
| ID01 | aaaa |
| ID02 | bbbb |
| ... | ... |
| ID1n | eeee |

*Fig. 2*

INTERACTIVE CONTROL SYSTEM AND METHOD

FIELD OF THE INVENTION

The present invention relates to voice interaction technology and voice recognition technology for utilizing predetermined services by interacting with a computer by voice.

BACKGROUND ART

With steady advances in the processing speed of computers, voice recognition technology for recognizing a user's utterances with a computer has come to be widely adopted. Moreover, voice interaction technology allowing acoustic interaction between computer and user through voice recognition technology and voice synthesis technology is garnering attention in many fields as one possible interface for making use of a computer without using a keyboard or a mouse. These technologies are used in a variety of fields, such as voice portals with which relevant information such as stock quotes or news can be obtained through a telephone line, car navigation systems that can be operated by voice while driving, mobile phones that can be operated by voice, or ticket reservation systems with which flight reservations can be placed by voice.

In conventional voice interaction technology, it is usually assumed that the user interacts by following one scenario of the interaction system. Moreover, in the case of voice portals providing a plurality of interactive services, the service structure is branched like a tree, and is not laid out for using a plurality of interactive services in parallel. Such interactive services are relatively effective for pursuing a single task, such as providing specific information or realizing a specific task.

However, the way that voice interaction services are used by the user is not necessarily limited to pursuing a single task, and it is also conceivable that a plurality of tasks are executed in parallel. For example, if the user finds an entry for a business trip while using an interactive service for schedule management, the user might want to confirm the weather at the locale of the business trip, and then return to the schedule management. Thus, it is desirable that the user can use interactive services in parallel, that is, to switch at any time between a plurality of interactive services that are running concurrently, and to return to a previously performed task.

Japanese Patent Application No. 2003-81136 proposes a context-sensitive complex voice interactive service, with which a plurality of voice interactive services are operated in parallel, and the user can switch the interactive service at any time, or the interactive service spontaneously addresses the user. In this system, in order for the user to freely switch between a plurality of voice interactive systems, the recognition lexicon needs to include not only the recognition terms accepted by the interactive service that is directly interacting with the user at a given time, but also the recognition terms that can be recognized by interactive services that are on stand-by in the background.

SUMMARY OF THE INVENTION

According to a first aspect of the present invention, an interactive control system that can interact with a plurality of interactive agents, includes:

an input portion that interprets input information input by a user, based on a recognition lexicon that has been generated in advance;

a recognition lexicon generation portion that obtains terms accepted by interactive agents from a group of interactive agents performing a response to a result of said interpretation, regenerates the recognition lexicon by consolidating the accepted terms of each of the interactive agents by excluding duplicate terms from the accepted terms of the interactive agents, generates consolidated and reorganized information associating identifiers of two or more conflicting interactive agents, which accept duplicate terms among the accepted terms of the interactive agents, with those terms, and performs, for each interaction, the obtaining of the accepted terms of the interactive agents, as well as the generation of the recognized lexicon and the consolidated and reorganized information;

an input interpretation portion that judges, based on the consolidated and reorganized information and the result of interpreting the input information with the input portion, whether there are interactive agents causing a conflict regarding the input information, that selects one of the interactive agents in accordance with a predetermined criterion or the consolidated and reorganized information, and that assigns the input information to the selected interactive agent; and a response output generation portion that obtains from the selected interactive agent a response corresponding to the interpretation result of the input information, and generates response output data.

By eliminating duplicate terms within the accepted terms of the agents, it is possible to avoid redundancies in the recognition lexicon. Consequently, it is possible to restrict the size of the recognition lexicon more than when the accepted terms of all interactive agents are used directly for the recognition lexicon. Moreover, which interactive agents are in conflict regarding which terms is stored as consolidated and reorganized information, so that by judging whether there is a conflict of interactive agents for a given input, it is possible to entrust the response to one of the conflicting interactive agents in case of a conflict. Consequently, it is possible to prevent a situation in which an interactive agent responds that the user hadn't even thought of. Moreover, by generating the recognition lexicon individually for each interaction, or in other words dynamically, it is possible to restrict the size of the recognition lexicon itself. Furthermore, the recognition rate becomes high even for interactive services for which preparing the recognition lexicon in advance is difficult, and a very user-friendly response becomes possible.

According to a second aspect of the present invention, in the interactive control system according to the first aspect, the recognition lexicon that has been generated in advance is generated by collecting accepted terms from all of the interactive agents in said group.

According to a third aspect of the present invention, in the interactive control system according to the first aspect, the recognition lexicon generation portion generates the recognition lexicon by selecting the accepted terms within a range that does not exceed a predetermined upper limit for the number of terms constituting the recognition lexicon.

Not only are duplicate terms eliminated, but an upper limit is set for the number of terms constituting the recognition lexicon, and terms outside that range are eliminated from the recognition lexicon. Thus, the recognition lexicon can be made even more compact, and it is possible to guarantee an improvement of the recognition rate as well as a high responsiveness.

According to a fourth aspect of the present invention, in the interactive control system according to the third aspect, the recognition lexicon generation portion further obtains importances of the accepted terms from the interactive agents, and generates the recognition lexicon by selecting the accepted terms based on these importances.

Thus, the terms are selected based on the importance of the accepted terms when selecting the accepted terms within the upper limit. Thus, it is possible to curb the influence this limitation has on the convenience for the user, and to guarantee an improvement of the recognition rate as well as a high responsiveness.

According to a fifth aspect of the present invention, in the interactive control system according to the third aspect, the recognition lexicon generation portion further obtains importances of the interactive agents, and generates the recognition lexicon by selecting the accepted terms based on these importances.

By including the accepted terms of important interactive agents, it can be expected that the interaction will be more natural for the user.

According to a sixth aspect of the present invention, in the interactive control system according to the third aspect, the recognition lexicon generation portion further obtains usage frequencies of the interactive agents, and generates the recognition lexicon by selecting the accepted terms based on these usage frequencies.

The recognition rate may be increased by including accepted terms from interactive agents with high usage frequency in the recognition lexicon.

According to a seventh aspect of the present invention, in the interactive control system according to the third aspect, the recognition lexicon generation portion further obtains dates/times when the interactive agents have accepted the accepted terms, and generates the recognition lexicon by selecting the accepted terms based on these dates/times.

Those terms among the accepted terms that have not been registered in the recognition lexicon and interactive agents accepting those terms are stored. Thus, if input information cannot be recognized, it is possible to internally judge the reason for this.

According to an eighth aspect of the present invention, the interactive control system according to any of the aspects 3 to 7, wherein the recognition lexicon generation portion generates deletion information associating terms that have not been selected as terms constituting the recognition lexicon with identifiers of interactive agents accepting those terms.

According to a ninth aspect of the present invention, an interactive control method executed by an interactive control system that can interact with a plurality of interactive agents includes:

an input step of interpreting input information input by a user, based on a recognition lexicon that has been generated in advance;

a recognition lexicon generation step of obtaining terms accepted by interactive agents from a group of interactive agents performing a response to a result of said interpretation, regenerating the recognition lexicon by consolidating the accepted terms of each of the interactive agents by excluding duplicate terms from the accepted terms of the interactive agents, generating consolidated and reorganized information associating identifiers of two or more conflicting interactive agents, which accept duplicate terms among the accepted terms of the interactive agents, with those terms, and performing, for each interaction, the obtaining of the accepted terms of the interactive agents, as well as the generation of the recognized lexicon and the consolidated and reorganized information;

an input interpretation step of judging, based on the consolidated and reorganized information and the result of interpreting the input information with the input portion, whether there are interactive agents causing a conflict regarding the input information, selecting one of the interactive agents in accordance with a predetermined criterion or the consolidated and reorganized information, and assigning the input information to the selected interactive agent; and a response output generation step of obtaining from the selected interactive agent a response corresponding to the interpretation result of the input information, and generating response output data.

According to a tenth aspect of the present invention, a computer-readable recording medium is provided, which stores an interactive control program executing a method according to the eighth aspect of the present invention. Here, examples of recording media include computer-readable flexible disks, hard disks, semiconductor memories, CD-ROMs, DVDs, magneto-optical disks (MOs), among others.

According to an eleventh aspect of the present invention, an interactive control program lets a computer execute an interactive control method according to the ninth aspect of the present invention.

With the present invention, when operating a plurality of interactive services in parallel, it is possible to specify interactive services that may respond to the same term. Moreover, by generating the recognition lexicon dynamically, it is possible to restrict the size of the recognition lexicon, and to preserve a natural flow of interaction while achieving both a high recognition rate and a high responsiveness.

BRIEF DESCRIPTION OF THE DRAWINGS

FIG. 2 is a schematic diagram of the accepted terms that the interactive agents forward to the interactive control system.

DESCRIPTION OF THE PREFERRED EMBODIMENTS

Figure 1:
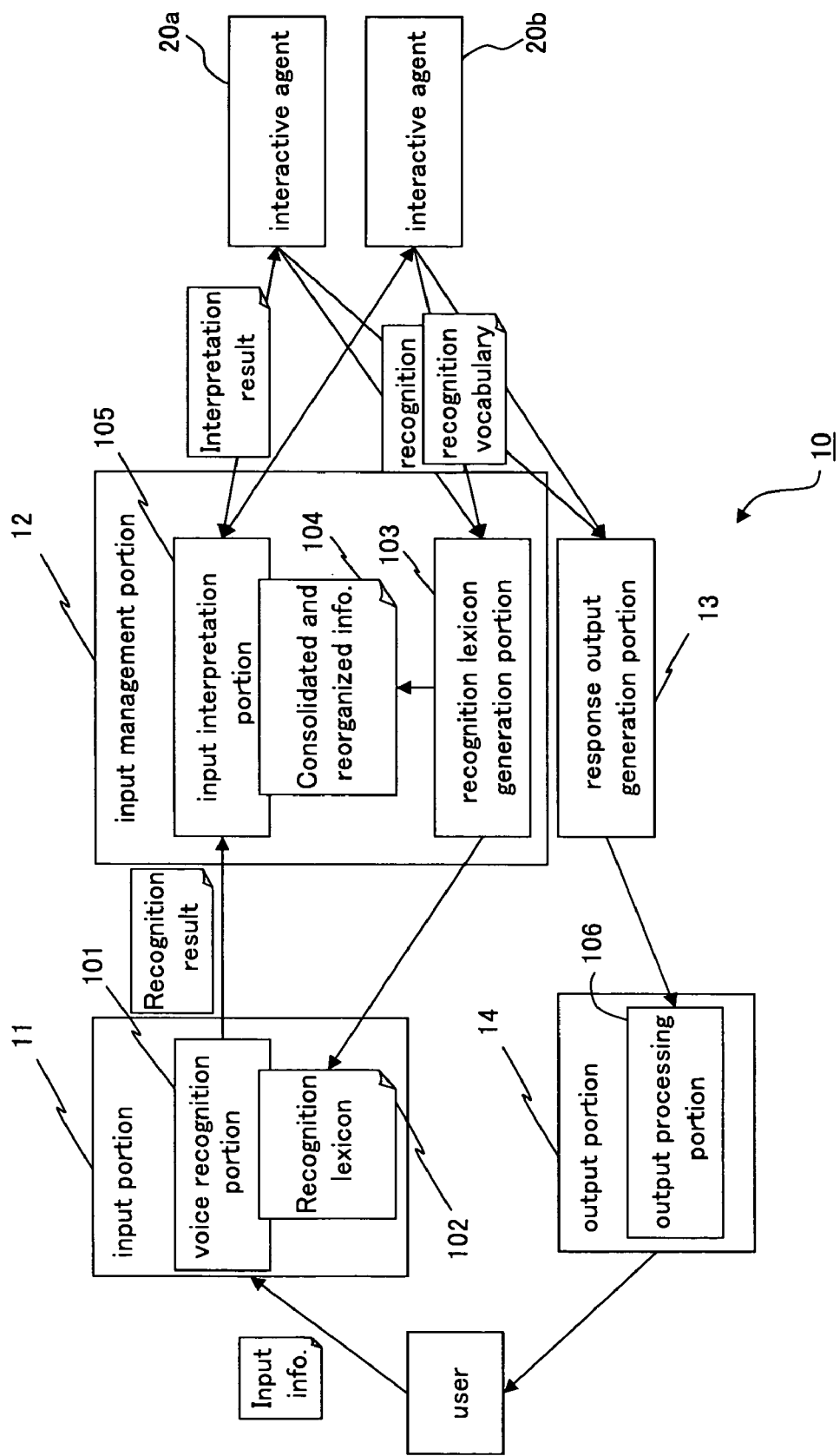
FIG. 1 is a diagram showing the configuration of an interactive control system in accordance with a first embodiment.

If a recognition vocabulary is needed that includes the recognition terms to be recognized by interactive services that are on stand-by in the background, then it is common to prepare and use a recognition lexicon that encompasses all terms that can be conceivably used in the interaction. However, in voice recognition, the recognition rate usually drops as the number of recognition terms in the recognition lexicon increases. And the more the types of interactive services that can be used increase, the more the number of terms that can conceivably be used will increase, so that with such recognition lexicons, the possibility is large that the proportion of unnecessary and unneeded terms will increase in a given situation. This decrease of the recognition performance due to unneeded terminology is posing a problem.

This problem can be improved by restricting the number of recognition terms. However, the downside of this is that when there is a smaller number of recognition terms, then the number of acceptable terms also decreases, so that there is the problem that the convenience for the user is lowered. Moreover, if the recognizable terms cannot be determined in advance, then it is basically impossible to prepare the recognition lexicon beforehand. An approach that has been used in order to solve this problem is that of using a dynamic lexicon, in which necessary sets of recognition terms are generated in accordance with the situation and the lexicon compilation is performed dynamically. In practice, VoiceXML processing systems can realize the dynamic compilation of lexicons that are annotated in VoiceXML scripts and use those lexicons. However, with dynamic lexicons, the time for compiling the lexicon affects the response time of the interaction, so that when the scale of the recognition lexicon becomes large, the response time of the interaction increases.

Furthermore, in systems in which a plurality of interactive systems operate in parallel, the plurality of interactive services each accept the recognition terms individually. Therefore, there is the possibility that a plurality of interactive services simultaneously accept identical phrases or terms or homonyms. In voice recognition engines, it is not possible to distinguish between utterances with the same arrangement of sounds, such as homophones, so that if a user utters such conflicting recognition terms, then it is not possible to discriminate by which interactive service the recognition term should be accepted. Therefore, there is the risk that an interactive service that was not intended by the user may respond, leading to an unnatural course of interaction.

In order to solve this problem, it is unrealistic to reduce the scale of the recognition lexicon, and to create a recognition vocabulary that does not conflict with other interactive services at the time of creation of the individual interactive services.

It is an object of the present invention to provide technology for identifying whether there are conflicts in recognition terms and identifying the conflicting interactive services when operating a plurality of freely created interactive services in parallel. It is a further object of the present invention to provide technology for achieving both good responsiveness and a high recognition rate and moreover preserving a natural flow of interaction while operating a plurality of interactive services in parallel.

First Embodiment

Overall Configuration

FIG. 1 is a diagram showing the configuration of an interactive control system in accordance with a first embodiment of the present invention. In this embodiment, a voice interaction is taken as an example. The interactive control system 10 is connected to a plurality of interactive agents 20a and 20b, and includes an input portion 11, an input management portion 12, a response output generation portion 13 and an output portion 14.

Referring to a recognition lexicon 102, the input portion 11 interprets input information that has been input by a user. The input portion 11 includes a voice recognition portion 101 and a recognition lexicon 102. The voice recognition portion 101 accepts voice information from the user. The recognition lexicon 102 is an aggregation of terms that the interactive control system can recognize. After the interaction has started, the recognition lexicon 102 is generated for each interaction by the input management portion 12. The recognition lexicon 102 that is used at the beginning of the interaction is prepared in advance. For example, the recognition lexicon at the beginning of the interaction can be prepared by collecting all terms for which there is the possibility of usage by any of the interactive agents.

The input management portion 12 includes a recognition lexicon generation portion 103 and an input interpretation portion 105.

The input interpretation portion 105 judges whether there are conflicting interactive agents present regarding the input information that was interpreted by the input portion 11, selects one of the interactive agents in accordance with the result of this judgment, and assigns the input information to the selected interactive agent. Here, "conflicting interactive agents" mean interactive agents for which the accepted terms overlap while their interactive services are being executed.

The interactive agents output, to the interactive control system, responses to the input information input into the input portion 11. In accordance with the provided input information, the interactive agent selected by the input interpretation portion 105 determines a suitable response and the necessary accepted terms. On the other hand, also the interactive agents that could not receive the input information may determine a response and the necessary accepted terms, if necessary.

At each interaction, the recognition lexicon generation portion 103 obtains from each of the interactive agents the terms that can be accepted at that time (also referred to simply as "accepted terms" in the following). FIG. 2 is a schematic diagram of the accepted terms that the interactive agents forward to the interactive control system. In this example, combinations of an accepted term and an identifier therefore are forwarded from the interactive agents to the interactive control system. Moreover, the recognition lexicon generation portion 103 consolidates the accepted vocabularies of the various interactive agents, and generates the recognition lexicon 102. The recognition lexicon generation portion 103 obtains the accepted vocabularies of the interactive agents and generates the recognition lexicon 102 and the consolidated and reorganized information 104 (explained below) for each single interaction. By generating the recognition lexicon 102 and the consolidated and reorganized information 104 for each single interaction, it is possible to restrict the size of the recognition lexicon 102. Moreover, replies with high recognition rate and high user convenience become possible even for interactive services for which it is difficult to prepare the recognition lexicon 102 in advance.

The response output generation portion 13 obtains the response corresponding to the input information from the selected interactive agent, and generates the response output data. The "response output data" may be audio data if the output device is a speaker, or it may be display data if the output device is a display device.

The output portion 14 outputs the response output data from the output processing portion 106. The output processing portion 106 may be for example an image processing portion or a voice processing portion.

In the interactive control system configured like this, by generating a recognition lexicon 102 that consolidates the accepted vocabularies of each of the agents, it is possible to restrict the size of the recognition lexicon 102 more than when the accepted vocabularies of all the interactive agents are directly adopted into the recognition lexicon 102. Moreover, by judging whether there is a conflict between interactive agents for a given input, it is possible to entrust the response to one of the conflicting interactive agents when there is a conflict. Consequently, it is possible to prevent situations in which an interactive agent responds that the user hadn't even thought of.

Functionality (1) Generation of a Recognition Lexicon

Figure 3:
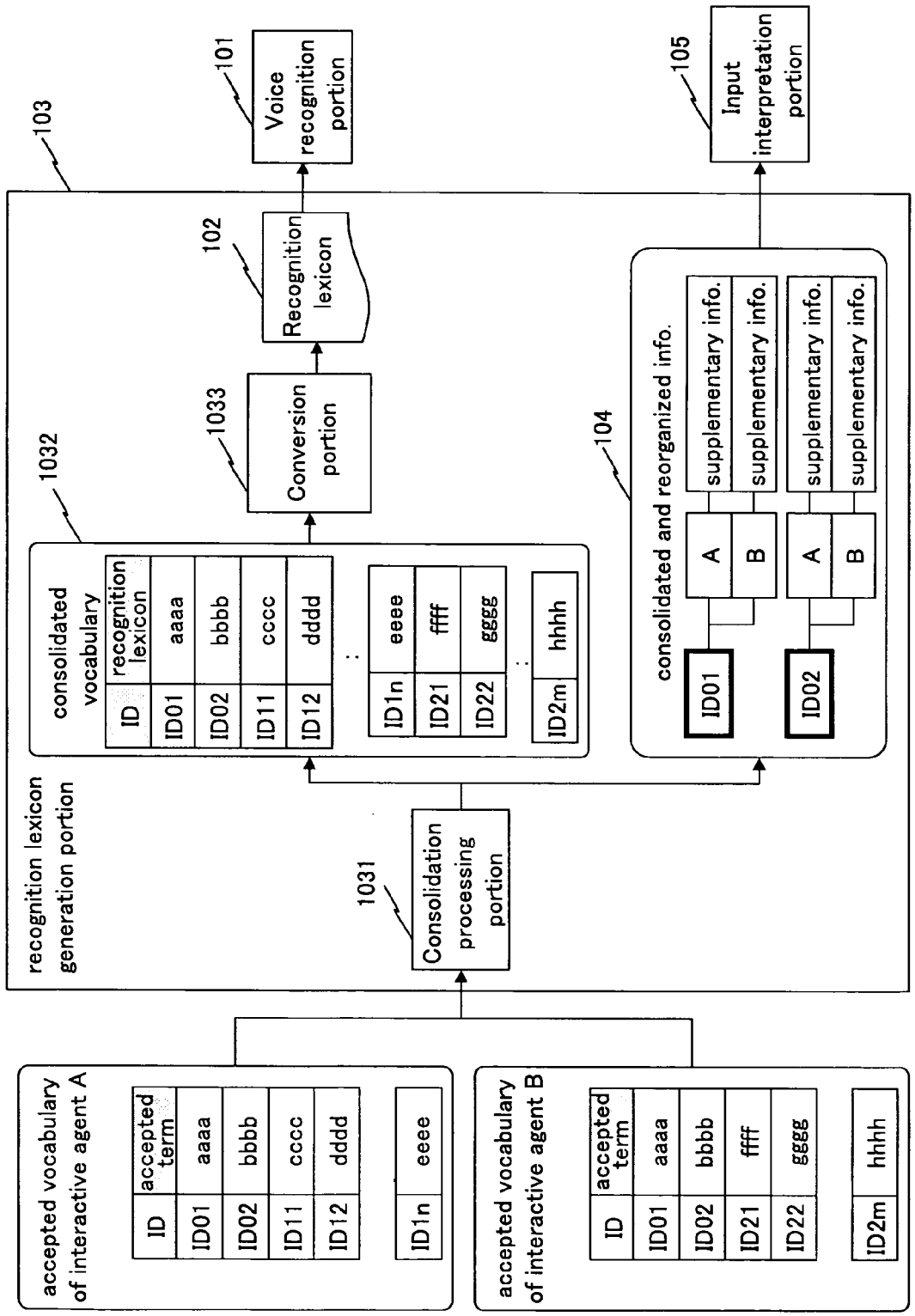
FIG. 3 is a functional diagram of the recognition lexicon generation portion.

FIG. 3 is a functional diagram of the recognition lexicon generation portion 103. By excluding duplicate accepted terms of the interactive agents, the recognition lexicon generation portion 103 generates the recognition lexicon 102. This recognition lexicon 102 is a collection of terms that are recognized at a given time by the interactive control system, and, in this example, it is generated for each interaction. By generating a recognition lexicon 102 without overlap of terms, it is possible to prevent redundancies in the recognition lexicon 102, and to increase the recognition rate for input information.

Furthermore, the recognition lexicon generation portion 103 generates consolidated and reorganized information 104 for duplicate terms in the accepted vocabularies of the interactive agents. The consolidated and reorganized information 104 associates the identifiers and terms of two or more conflicting interactive agents accepting duplicate terms. If necessary, the consolidated and reorganized information 104 may also include supplementary information associated therewith. The supplementary information is forwarded from the interactive agents 20 to the interactive control system 10 together with the accepted terms, and is written by the recognition lexicon generation portion 103 into the consolidated and reorganized information 104 together with the terms. The following is a list of examples of supplementary information:

(i) the importance that each interactive agent gives to the term;
(ii) the usage frequency of the interactive agent, as calculated from an interaction history;
(iii) the date and time when the interactive agent has accepted that term;
(iv) the importance of the interactive agent;
(v) category information for the term.

An example of a category is information indicating that the term is a command that is shared by a plurality of interactive agents.

As noted above, the supplementary information is forwarded together with the accepted terms from the interactive agents to the interactive control system, but the supplementary information (ii), that is, the usage frequency, may also be calculated by the interactive control system. That is to say, the interactive control system 10 may be provided with an interaction history storage portion (not shown in the drawings) and a usage frequency calculation portion (not shown in the drawings). Here, the interaction history storage portion stores the usage history of each of the interactive agents for each user. Moreover, the usage frequency calculation portion calculates the usage frequency of each of the interactive agents from the usage history. Then, the recognition lexicon generation portion 103 obtains the usage frequency of the interactive agent accepting a term from the usage frequency calculation portion, and writes it into the consolidated and reorganized information 104. Conversely, it is also possible that each interactive agent calculates the usage history and the usage frequency for each user and this information is forwarded together with the accepted terms to the interactive control system.

Describing the above in more detail with further reference to FIG. 3, the recognition lexicon generation portion 103 consolidates the accepted vocabularies of the various interactive agents with a consolidation processing portion 1031, and generates the consolidated and reorganized information 104. The generated consolidated and reorganized information 104 is passed on to the input interpretation portion 105, and is used to interpret the input information. On the other hand, a consolidated accepted vocabulary 1032 is converted by a conversion portion 1033 into the recognition lexicon 102, and passed to the voice recognition portion 101.

Figure 4:
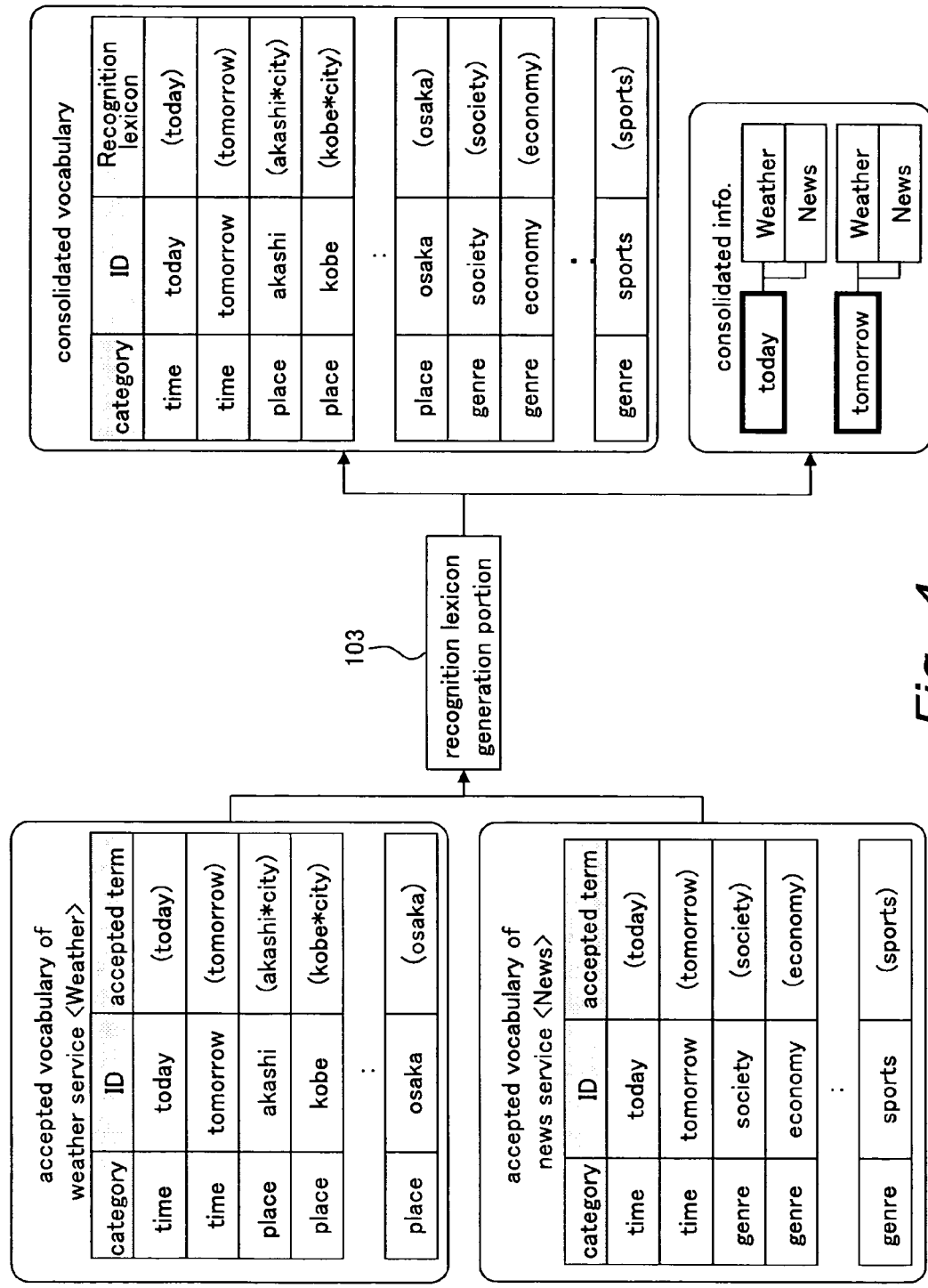
FIG. 4 is a diagram showing a example of accepted vocabularies consolidated by the recognition lexicon generation portion.

FIG. 4 is a diagram showing a example of accepted vocabularies consolidated by the recognition lexicon generation portion 103. In this example, the accepted vocabularies from a weather service <Weather> and a news service <News> are forwarded to the interactive control system. The recognition lexicon generation portion 103 consolidates the two accepted vocabularies and writes "today" and "tomorrow", which overlap in the accepted vocabularies into the consolidated and reorganized information 104. Moreover, the identifiers <Weather> and <News> of the corresponding interactive agents are written into the consolidated and reorganized information 104 in association with the duplicate accepted terms. It should be noted that the duplicate accepted terms "today" and "tomorrow" are stored individually in the consolidated vocabulary.

(2) Assigning of Input Information

Figure 5:
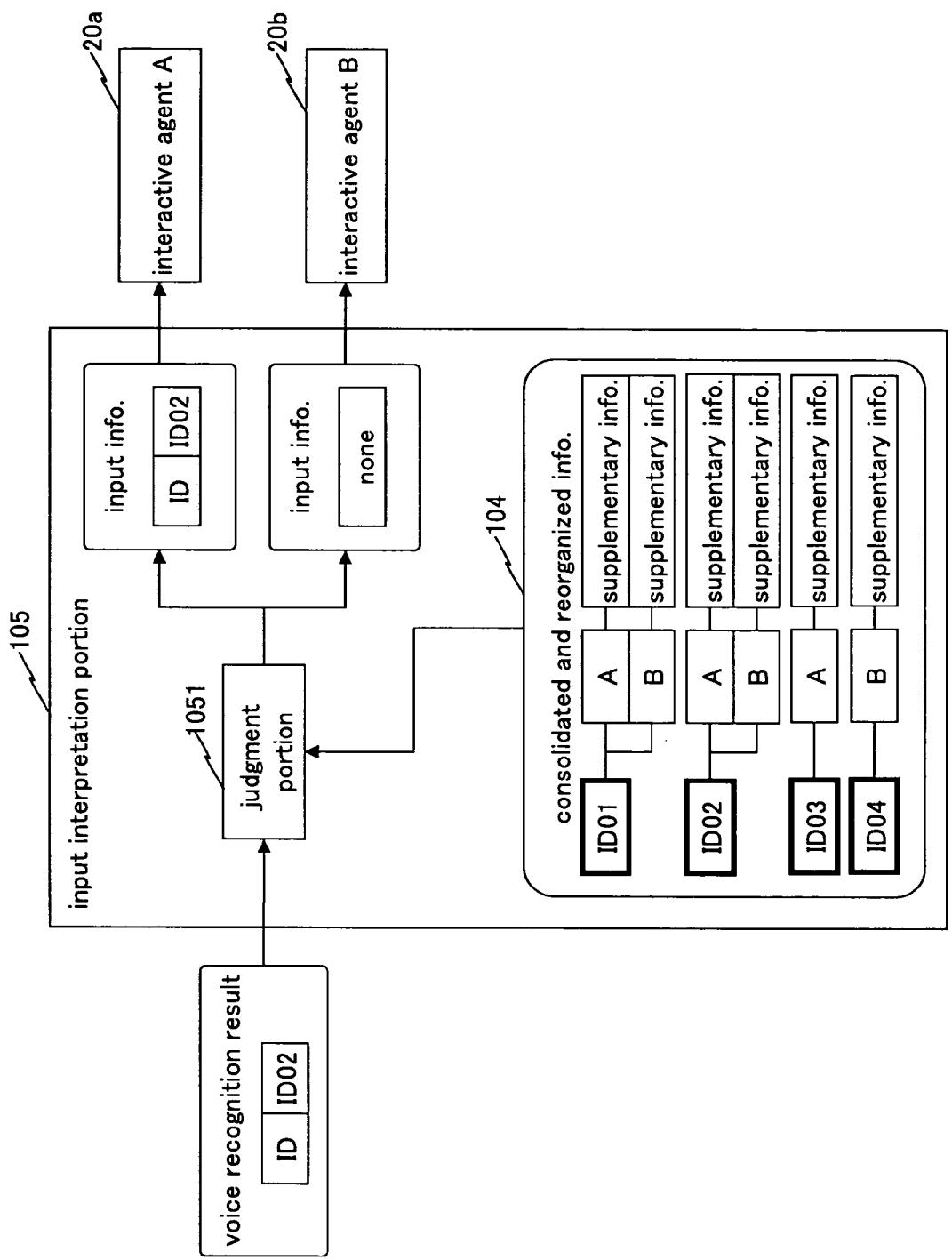
FIG. 5 is a diagram illustrating the functionality of the input interpretation portion.

FIG. 5 is a diagram illustrating the function of the input interpretation portion 105. The input interpretation portion 105 judges, based on the consolidated and reorganized information 104, whether there are conflicting interactive agents. If there is a conflict regarding the result of the interpretation of the input information, then one of the conflicting interactive agents specified by the consolidated and reorganized information 104 is selected, and the input information is provided to the selected interactive agent.

More specifically, when receiving the voice recognition result of the input information from the input portion 11, a judgment portion 1051 judges whether this voice recognition result matches with any of the terms in the consolidated and reorganized information 104. If the interpretation result of the input information is not included in the consolidated and reorganized information 104, that is, if a term has been entered that has not been deleted, then the input information is provided to one of the interactive agents. For example, the input information may be provided to the interactive agent that has responded immediately before or to the interactive agent that has the highest usage frequency. Alternatively, it is also possible to present the input information sequentially to the interactive agents until there is a response from one of the interactive agents.

If the input information matches one of the terms in the consolidated and reorganized information 104, then the judgment portion provides the input information to one of the interactive agents associated with that matching term. If the consolidated and reorganized information 104 includes supplementary information, then the judgment portion may also select an interactive agent in consideration of that supplementary information. As noted above, the recognition lexicon generation portion 103 writes the supplementary information into the consolidated and reorganized information 104 together with the terms. The following are examples of supplementary information and of methods for selecting an interactive agent based on the supplementary information.

(i) The importance assigned to the term by each of the interactive agents may be included in the supplementary information. In this case, the interactive agent assigning the highest importance may be selected.

(ii) The usage frequency of the interactive agents as obtained by calculation from the interaction history may be included in the supplementary information. In that case, the interactive agent with the highest usage frequency may be selected.

(iii) The date and time when the interactive agent has accepted the term may be included in the supplementary information. In that case, the interactive agent corresponding to the most recent date and time may be selected.

(iv) The importance of the interactive agent may be included in the supplementary information. In case of a conflict, the interactive agent with the highest importance may be selected. It should be noted that if both the importance of the interactive agents and the importance of the terms are included in the supplementary information, then it is also possible to select an interactive agent based on both. For example, it is possible to compare the product of the importance of the interactive agent and the importance of the term, and to select an interactive agent based on the result of that comparison.

(v) Category information associated with the term may be included in the supplementary information. In that case, an interactive agent accepting a term belonging to a specific category may be selected. An example of a specific category is the category to which commands shared by a plurality of interactive agents belong.

The supplementary information and the methods for selecting the interactive agent are not limited to the foregoing. And needless to say, it is also possible to combine the above examples as appropriate.

Furthermore, it is also possible that the input interpretation portion 105 queries without using the supplementary information the interactive agents one by one whether input information is needed, and selects the first interactive agent that replies with "yes."

Process Flow

Figure 6:
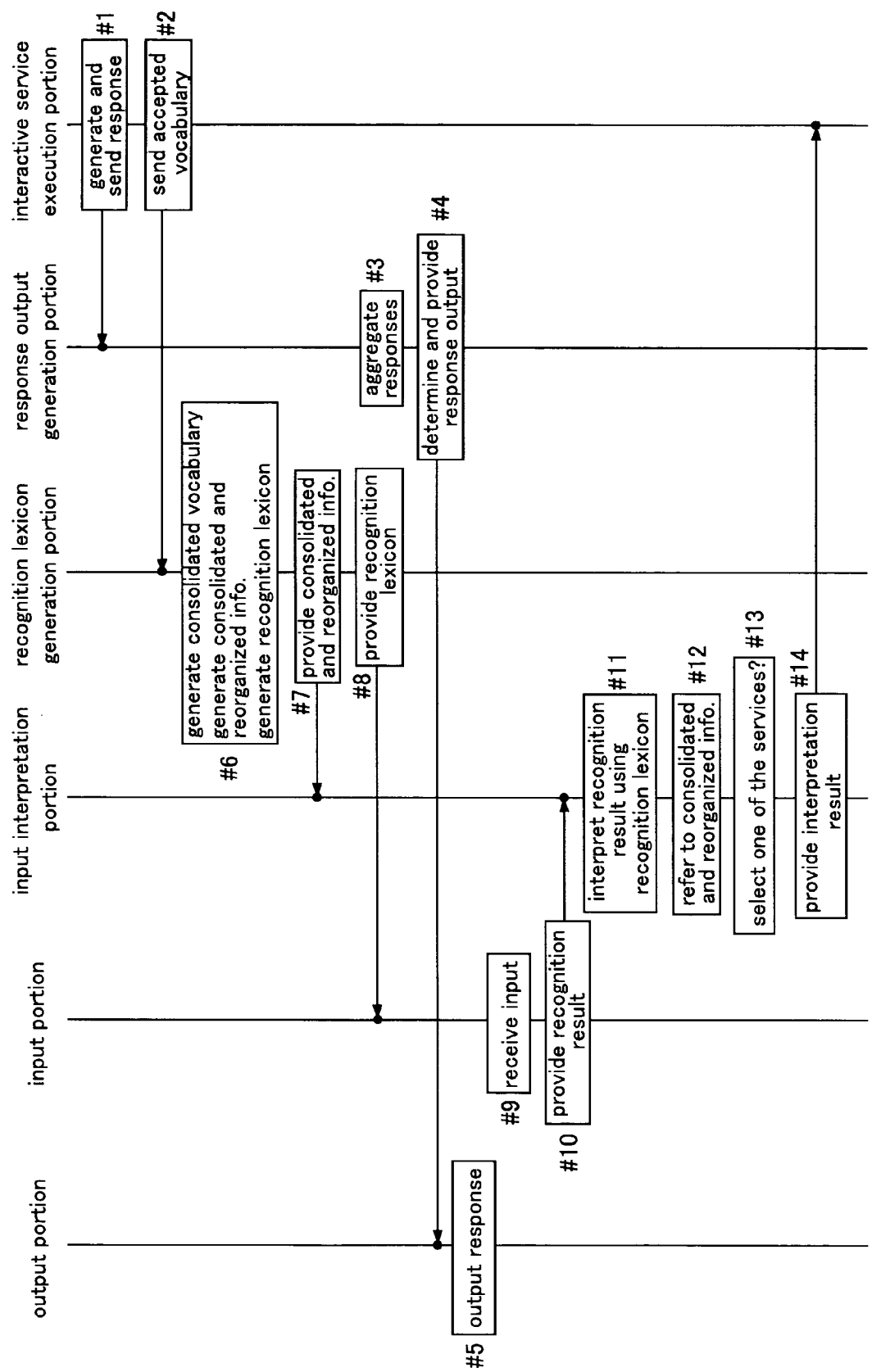
FIG. 6 is a diagram illustrating the process flow performed by the interactive control system.

FIG. 6 is a diagram illustrating the process flow performed by the interactive control system. First, an interactive agent sends a response (#1) to an input by a user (not shown in the drawings), and sends the accepted vocabulary for the next response (#2).

The interactive control system that has received the response and the accepted vocabulary then performs the following operation: First, the response output generation portion 13 aggregates the responses from each of the interactive agents (#3), generates the response output data and outputs the response data from the output portion 14 (#4, #5). If the output portion 14 is provided with a plurality of output devices, then the aggregation of responses may be the generation of output data for each of the output devices.

On the other hand, the recognition lexicon generation portion 103 collects the accepted vocabularies from the interactive agents, consolidates them, and regenerates the consolidated and reorganized information 104 as well as the recognition lexicon 102 (#6). The input interpretation portion 105 obtains the consolidated and reorganized information 104, and the input portion 11 obtains the recognition lexicon 102 (#7, #8).

When input information is input by the user (#9), then the voice recognition result is provided by the input portion 11 to the input interpretation portion 105 (#10). The input interpretation portion 105 interprets the voice recognition result using the recognition lexicon 102 (#11), and, referring to the consolidated and reorganized information 104, judges whether there are conflicting interactive agents (as well as their identifiers) for the voice recognition result (#12). Furthermore, the input interpretation portion 105 selects the interactive agent providing the response to the input information (#13), and provides the interpretation result to that interactive agent (#14).

Effect

With the interactive control system according to this embodiment, a recognition lexicon 102 is generated by consolidating accepted vocabularies, so that there are no duplicate terms in the recognition lexicon 102, and redundancies in the recognition lexicon 102 can be avoided. Therefore, the increase of terms in the recognition lexicon 102 can be restricted, and a lowering of the recognition rate of input information can be prevented. Furthermore, with the consolidated and reorganized information 104, it is possible to specify a plurality of interactive agents that can respond to the input information.

Second Embodiment

Figure 7:
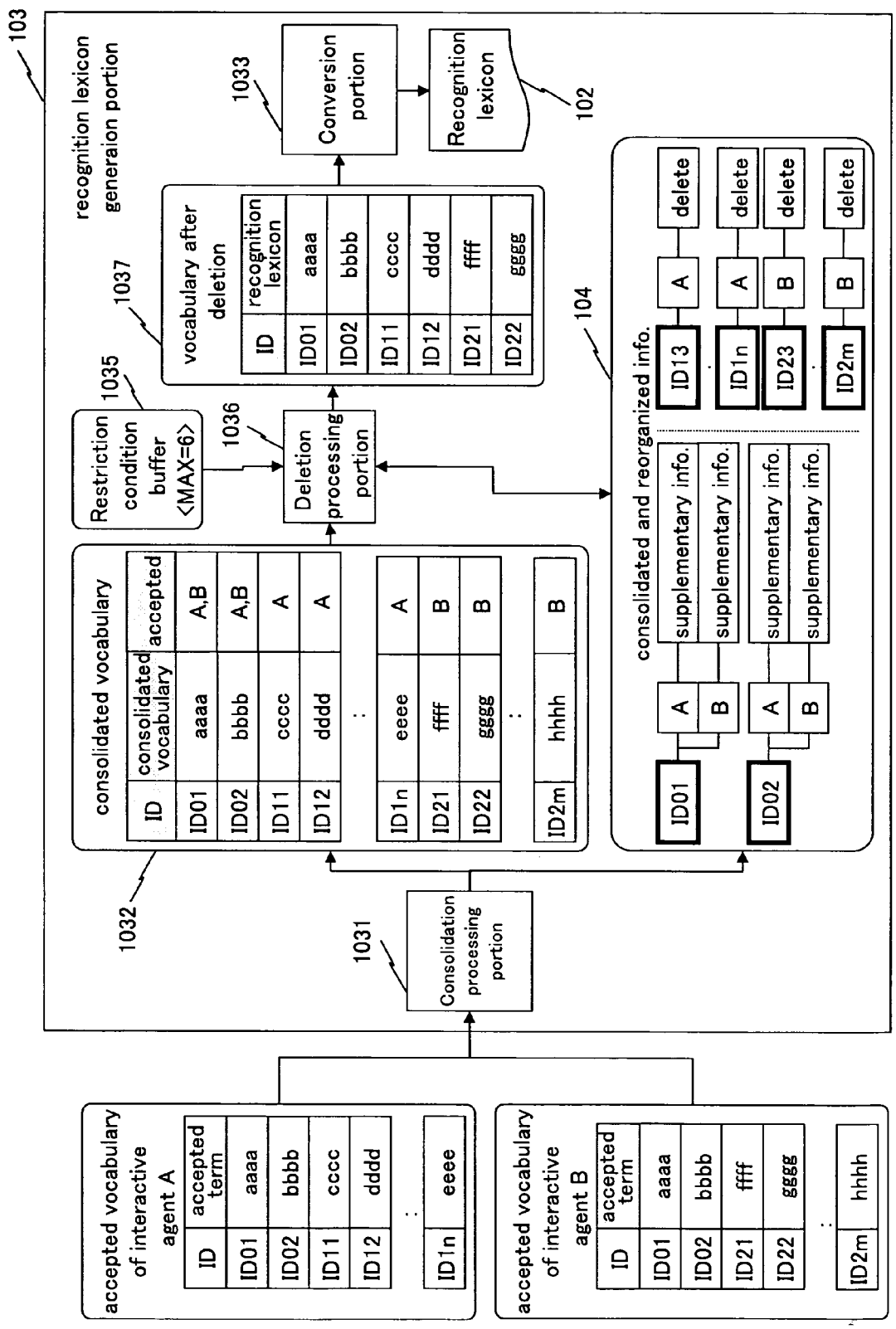
FIG. 7 is a functional diagram of the recognition lexicon generation portion of an interactive control system according to a second embodiment.

FIG. 7 is a functional diagram of the recognition lexicon generation portion 103 of an interactive control system according to a second embodiment. The interactive control system according to the second embodiment has a similar configuration as the one in FIG. 1. However, this recognition lexicon generation portion 103 generates the recognition lexicon 102 by selecting accepted terms within a range that does not exceed a predetermined upper limit of terms constituting the recognition lexicon 102.

This is explained in more detail with reference to FIG. 7. The consolidation processing portion 1031 of the recognition lexicon generation portion 103 obtains a vocabulary 1032 that has been consolidated such that there are no duplicate terms among the accepted terms from the interactive agents. Moreover, consolidated and reorganized information 104 is generated. A restriction condition buffer 1035 stores a restriction condition for the generation of the recognition lexicon 102. In this example, the restriction condition that the upper limit of the number of terms in the recognition lexicon is "6" has been stored beforehand in the restriction condition buffer 1035. A deletion process portion 1036 selects six terms from the consolidated vocabulary, and deletes the remaining terms, and generates a recognition lexicon 1037. After this, the recognition lexicon 1037 is converted by the conversion portion 1033 into the recognition lexicon 102.

By not only eliminating duplicate terms but also setting an upper limit for the number of terms constituting the recognition lexicon and deleting all terms outside this range from the recognition lexicon 102, the recognition lexicon 102 can be made even more compact, and an improvement of the recognition rate as well as a high responsiveness can be guaranteed.

It should be noted that it is possible to use the above-described supplementary information in order to decide which terms to delete from the recognition lexicon 102. Examples of this are deleting terms with low importance or deleting accepted terms of interactive agents with low importance. Moreover, if the above-noted categories are included in the supplementary information, then it is also possible to exclude terms belonging to a specific category from the terms to be deleted.

Furthermore, the recognition lexicon generation portion 103 may also write information (corresponding to deletion information) associating terms that were not selected as the terms constituting the recognition lexicon 102 with the identifiers of the interactive agents accepting these terms into the consolidated and reorganized information 104. Thus, it is possible to internally judge the reason why there is no response to a given input, as seen by the user.

Third Embodiment

Figure 8:
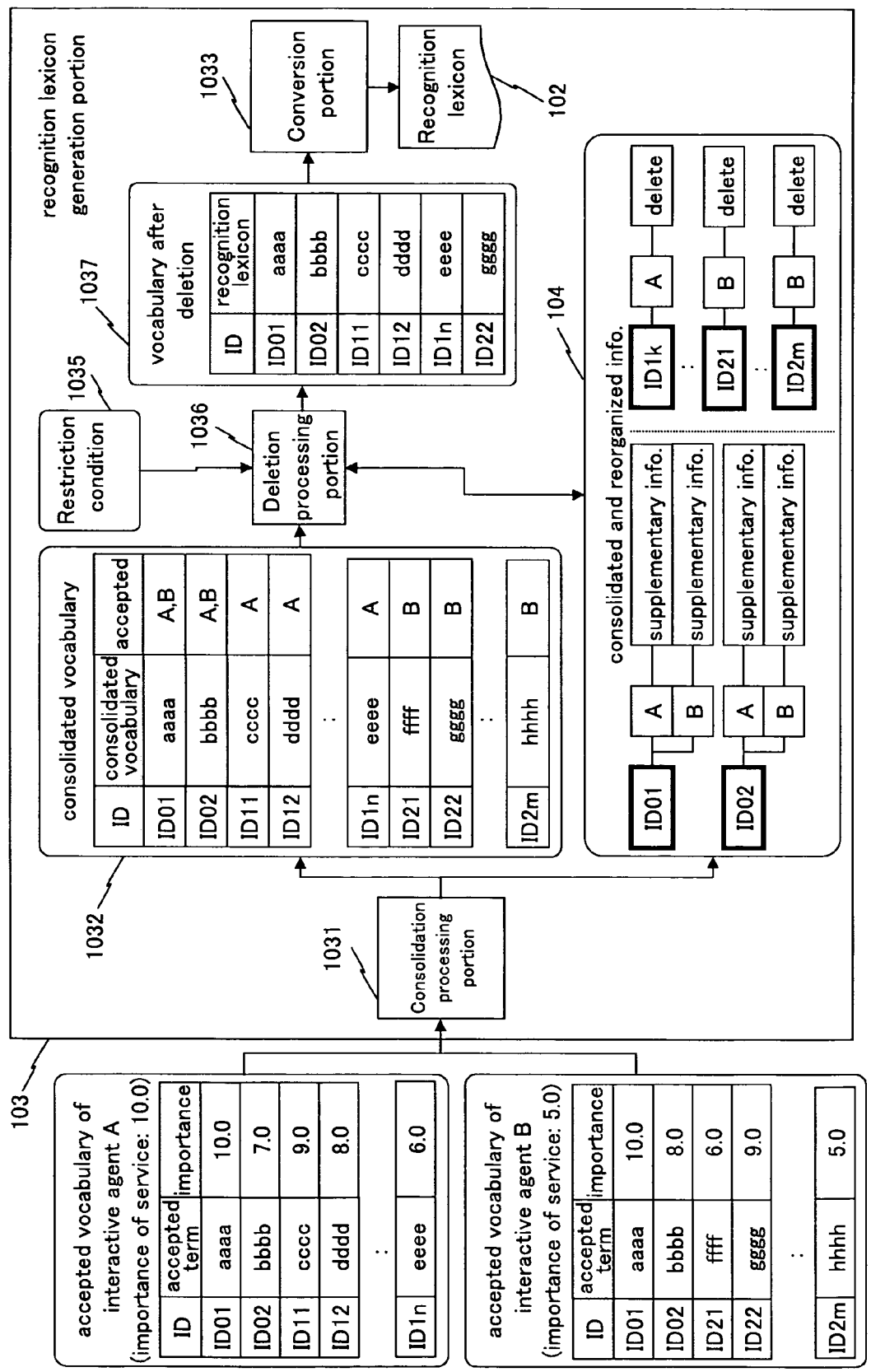
FIG. 8 is a functional diagram of the recognition lexicon generation portion of an interactive control system according to a third embodiment.

FIG. 8 is a functional diagram of the recognition lexicon generation portion 103 of an interactive control system according to a third embodiment. The interactive control system according to the third embodiment has a similar configuration as the one in FIG. 1. However, in addition to the functionality of the second embodiment, this recognition lexicon generation portion 103 generates the recognition lexicon 102 by further obtaining the importance of each accepted term from the interactive agents and selecting accepted terms depending on their importance.

This is explained in more detail with reference to FIG. 8. The consolidation processing portion 1031 of the recognition lexicon generation portion 103 consolidates the accepted terms from the interactive agents, and generates the consolidated and reorganized information 104. The restriction condition buffer 1035 stores restriction conditions for generating the recognition lexicon 102. In this example, the following Restriction Conditions 1 to 3 are stored in the restriction condition buffer 1035:

Restriction Condition 1: The upper limit for the number of terms in the recognition lexicon is "6";

Restriction Condition 2: Priority is given to terms with high importance;

Restriction Condition 3: For terms with the same importance, priority is given to the accepted term of the interactive agent with the highest importance.

Thus, the deletion processing portion 1036 will attempt to select six terms from the consolidated accepted terms in the order of priority. In this situation, the accepted term "eeee" (with a priority of 6.0) of the interactive agent A and the accepted term "ffff" of the interactive agent B have the same priority, but if both were selected, then the number of terms in the recognition lexicon would be seven. In that case, the importance of the interactive agent A is higher, so that "eeee" is selected and "ffff" is deleted, thus generating the recognition lexicon 1037. After that, the recognition lexicon 1037 is converted into audio signals by the conversion portion 1033, resulting in the recognition lexicon 102.

Thus, it is possible to guarantee a high recognition rate and good responsiveness without compromising user-friendliness by selecting the terms according to the importance of the accepted terms when selecting accepted terms within the upper limit.

Furthermore, as in the second embodiment, the recognition lexicon generation portion 103 may also write information (corresponding to deletion information) associating terms that were not selected as the terms constituting the recognition lexicon 102 with the identifiers of the interactive agents accepting these terms into the consolidated and reorganized information 104. Thus, it is possible to internally judge the reason why there is no response to a given input, as seen by the user.

Fourth Embodiment

Figure 9:
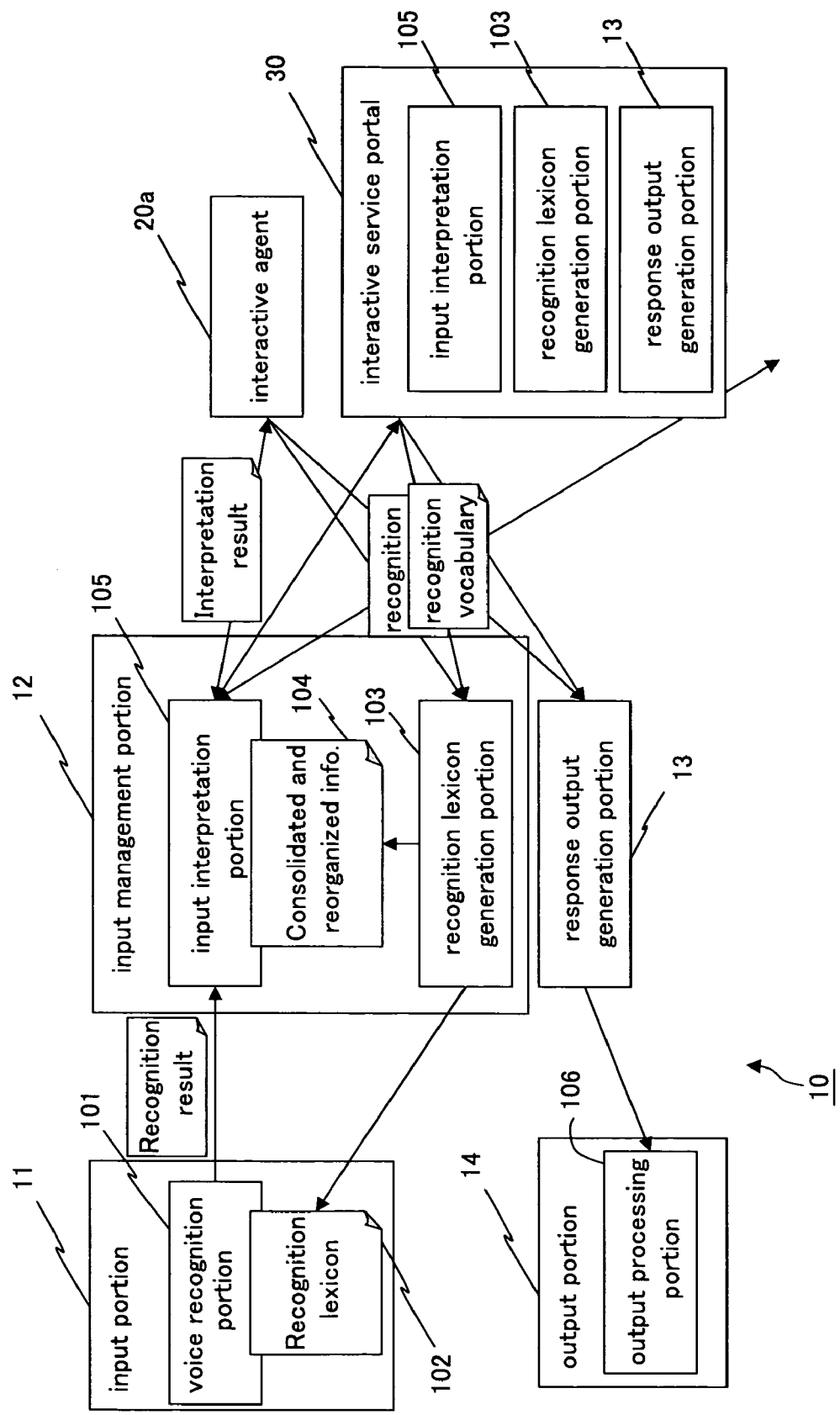
FIG. 9 is a diagram of the overall configuration of an interactive control system according to a fourth embodiment.

FIG. 9 is a diagram of the overall configuration of an interactive control system according to a fourth embodiment. In this embodiment, one of the interactive agents connected to the interactive control system 10 is an interactive service portal 30. This interactive service portal 30 includes an input interpretation portion 105, a recognition lexicon generation portion 103, and a response output generation portion 13. Subordinate to this portal, a plurality of interactive agents are connected (not shown in the drawings). By repeating this, it is possible to connect interactive agents in a tree-like manner. The functionality of the other structural elements is the same as in the first to third embodiments.

Fifth Embodiment

Figure 10:
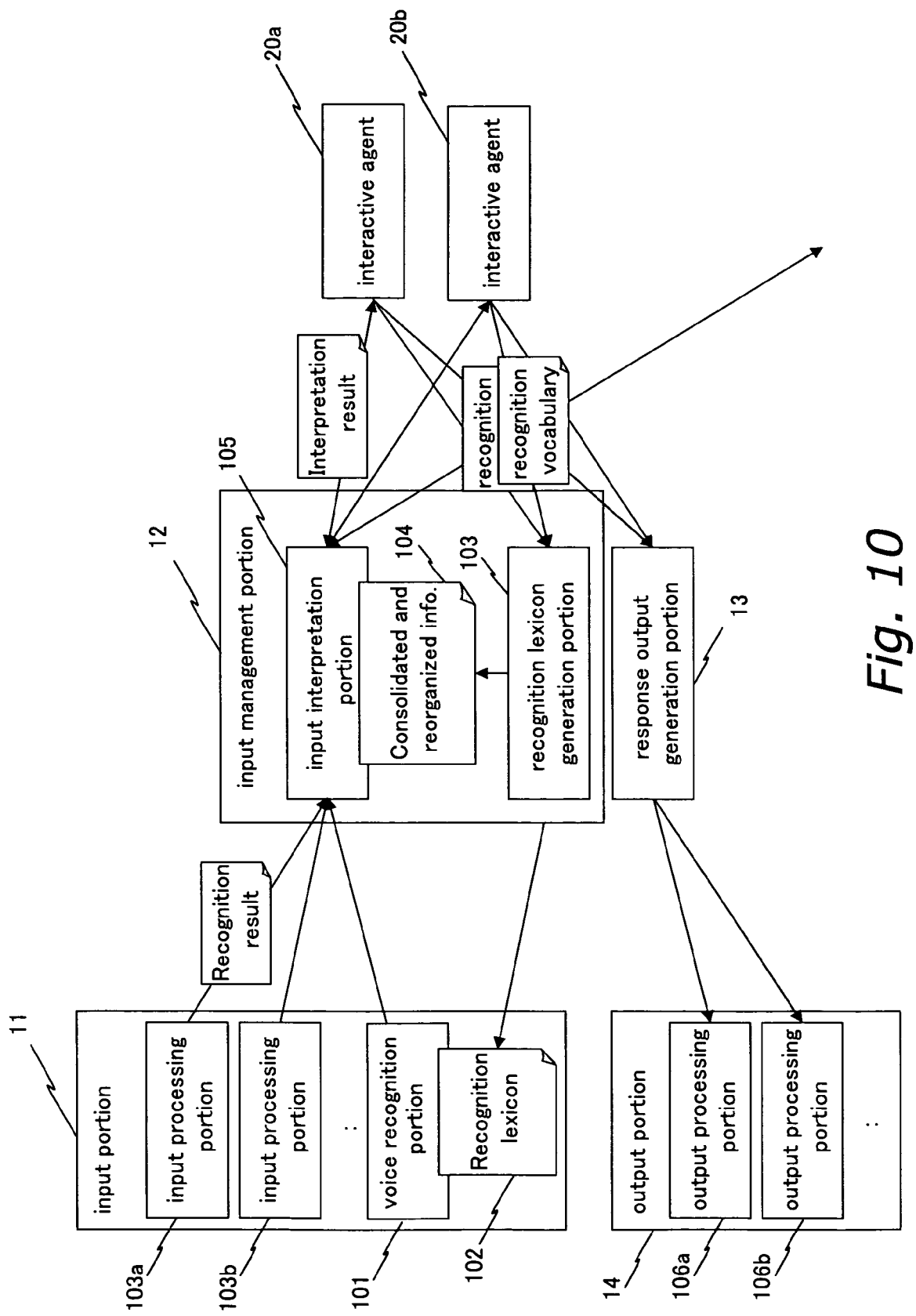
FIG. 10 is a diagram of the overall configuration of an interactive control system according to a fifth embodiment.

FIG. 10 is a diagram of the overall configuration of an interactive control system according to a fifth embodiment. In this embodiment, the input portion 11 and the output portion 14 of the interactive control system 10 are respectively provided with a plurality of input processing portions 103a, 103b . . . and a plurality of output processing portions 106a, 106b . . . The input processing portions 103 and the output processing portions 106 are provided in correspondence with a plurality of input devices, such as a microphone, a keyboard and a mouse, and a plurality of output devices, such as a speaker and a display. The functionality of the other structural components is the same as in the first to third embodiments.

Other Embodiments (A) In the first embodiment, an example of a voice interaction was given, but the present invention can also be applied to an interaction by hand-written characters or an interaction by keyboard input.

(B) The scope of the present invention also encompasses programs for executing the above-described methods as well as computer-readable recording media that can store such a program. Here, examples of recording media include computer-readable flexible disks, hard disks, semiconductor memories, CD-ROMs, DVDs, magneto-optical disks (MOs), among others.

Working Example 1

Figure 11:
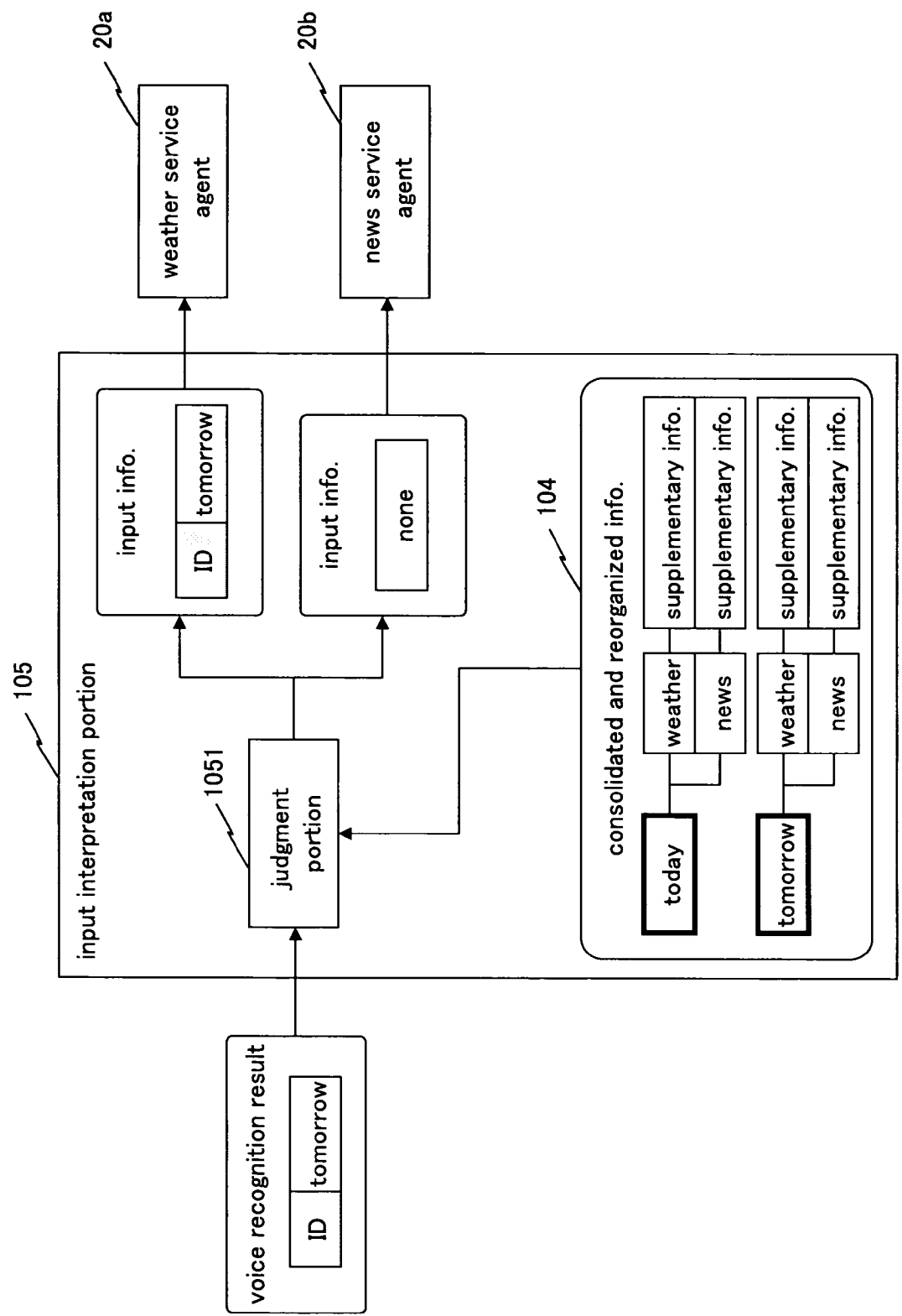
FIG. 11 is a diagram showing a working example of an interactive control system.

FIG. 11 is a diagram showing a working example of an interactive control system. In this example, two interactive control systems, namely a weather service agent 20a and a news service agent 20b, are connected to an interactive control system. Let us assume that the vocabulary that can be recognized at a given moment by the weather service 20a is "today", "tomorrow", "day after tomorrow", "today's weather", "tomorrow's weather", "day after tomorrow's weather". Moreover, let us assume that the vocabulary that can be recognized by the news service agent 20b is "today", "tomorrow", "day after tomorrow", "today's news", "tomorrow's events", "day after tomorrow's events". In this case, "today", "tomorrow", "day after tomorrow" are duplicate, so that these words are stored by the recognized lexicon generation portion as consolidated and reorganized information.

Let us assume that in this situation, the user utters the word "tomorrow." Based on the consolidated and reorganized information 104, the input interpretation portion 105 judges that there is a conflict between the weather service agent 20a and the new service agent 20b. As the method for deciding to which of the conflicting interactive services the input information should be forwarded, any of the methods described above is conceivable, although there is no particular limitation to these.

Working Example 2

Figure 12:
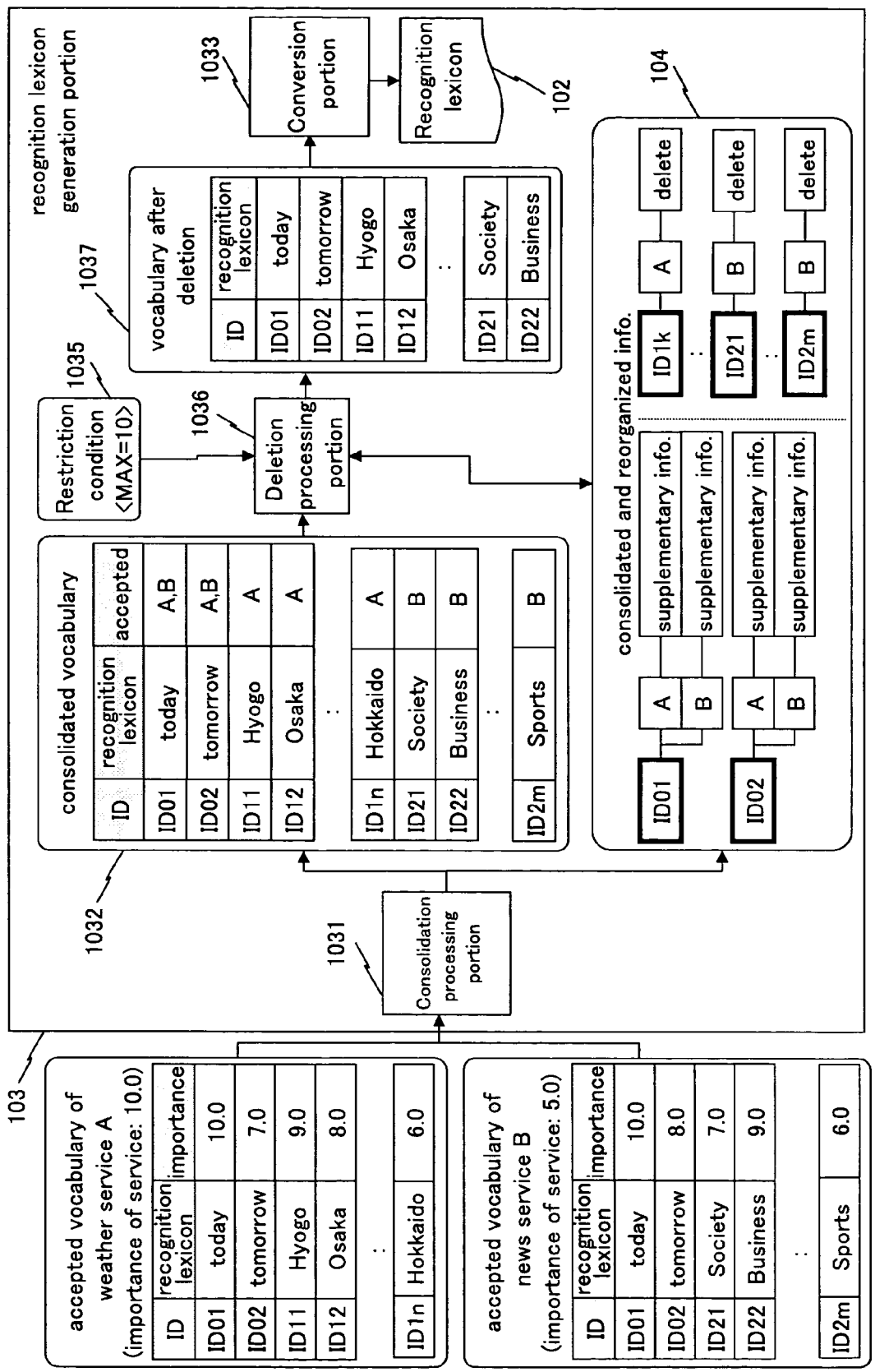
FIG. 12 is a diagram showing another working example of an interactive control system.

FIG. 12 is a diagram showing another working example of an interactive control system. In this example, two interactive control systems, namely a weather service agent 20a and a news service agent 20b, are connected to an interactive control system. Let us assume that the vocabulary that can be recognized at a given moment by the weather service 20a is "today" and "tomorrow", as well as place names such as "Hyogo", "Osaka" etc. Moreover, let us assume that the vocabulary that can be recognized by the news service agent 20b is "today", "tomorrow" as well as genres such as "society", "business", "politics", "international", "sports" etc. There is no overlap between place names and genres.

Furthermore, the importance of "today" and "tomorrow" in the news service agent 20a is high, whereas for place names the importance of "Hyogo" is highest, followed by the surrounding prefectures, such as "Okayama", "Kyoto", "Tottori" and "Kagawa". On the other hand, the importance of "today", "tomorrow", "society" and "business" in the news service agent 20b is high.

Now let us assume that due to restrictions in the usage environment, only up to ten recognition terms can be registered all in all, and that the weather service is used more often so that its importance is higher. In accordance with the importance of the interactive services, the recognition lexicon generation portion 103 allocates seven of the accepted terms for weather and three of the accepted terms for news. This allocation is calculated for example by the following function:

(the number of accepted terms for weather service)= ((upper limit of terms)×(importance of weather service))÷((importance of weather service)+(importance of news service))

(the number of accepted terms for news service)=((upper limit of terms)×(importance of news service)) ÷((importance of weather service)+(importance of news service))

In accordance with these equations, the number of accepted terms for the weather service is 6.6, whereas the number of accepted terms for the news service is 3.3, and rounding these figures to the nearest integer yields 7 and 3.

Furthermore, "today" and "tomorrow" are overlapping, so that the recognition lexicon generation portion 103 stores them in the consolidated and reorganized information 104. One term is shared by two interactive agents, so that if these are counted as 0.5 terms, "today", "tomorrow", "Hyogo" "Osaka", "Okayama", "Kyoto", "Tottori" and "Kagawa" are selected for the weather service, whereas "today", "tomorrow", "society" and "business" are selected for the news service. Then, the remaining terms are stored in the consolidated and reorganized information as terms that have not been registered.

Finally, the consolidated terms are aggregated, and the ten terms "today", "tomorrow", "Hyogo" "Osaka", "Okayama", "Kyoto", "Tottori" and "Kagawa", "society" and "business" are registered in the recognition lexicon 102.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An interactive control apparatus that interacts with a plurality of interactive agents, comprising:

a computer;

an input portion for interpreting information input by a user, based on a recognition lexicon that has been generated in advance;

a recognition lexicon generation portion for obtaining terms accepted by each of a plurality of interactive agents performing a response to a result interpreted by the input portion, regenerating the recognition lexicon by consolidating the accepted terms by excluding duplicate terms from the accepted terms, generating, separately from the recognition lexicon, consolidated and reorganized information associating the duplicate terms with identifiers of two or more conflicting interactive agents, which accepted the duplicate terms, performing, for each interaction, the obtaining of the accepted terms, and performing, for each interaction, the generation of the recognition lexicon and the consolidated and reorganized information;

an input interpretation portion for selecting one of the interactive agents and assigning the input information to the selected interactive agent, when the input portion interprets a word which exists only in the recognition lexicon and assigning the interpreted result of the input information to an interactive agent corresponding to any of the identifiers of the conflicting interactive agents associated with the input information based upon an importance given to each interactive agent, an importance given to the duplicate term, usage frequency of each interactive agent based upon historical data, and the most recent interactive agent associated with the duplicate term, when the interpreted information input is included in the consolidated and reorganized information and a response output generation portion for obtaining, from the selected interactive agent or the interactive agent corresponding to any of the identifiers of the conflicting interactive agents associated with the input information, a response corresponding to the interpretation result of the input information, and generating response output data.

2. The interactive control apparatus according to claim 1, wherein the recognition lexicon that has been generated in advance is generated by collecting accepted terms from all of the interactive agents in said group.

3. An interactive control apparatus that can interact with a plurality of interactive agents, comprising:

a computer;

an input portion that interprets input information input by a user, based on a recognition lexicon that has been generated in advance;

a recognition lexicon generation portion that obtains terms accepted by interactive agents from a group of interactive agents performing a response to a result of said interpretation, regenerates the recognition lexicon by consolidating the accepted terms of each of the interactive agents by excluding duplicate terms from the accepted terms of the interactive agents, generates consolidated and reorganized information associating identifiers of two or more conflicting interactive agents, which accept duplicate terms among the accepted terms of the interactive agents, with those terms, and performs, for each interaction, the obtaining of the accepted terms of the interactive agents, performs as well as the generation of the recognized lexicon and the consolidated and reorganized information;

an input interpretation portion for selecting one of the interactive agents and assigning the input information to the selected interactive agent, when the input portion interprets a word which exists only in the recognition lexicon and assigning the interpreted result of the input information to an interactive agent corresponding to any of the identifiers of the conflicting interactive agents associated with the input information based upon an importance given to each interactive agent, an importance given to the duplicate term, usage frequency of each interactive agent based upon historical data, and the most recent interactive agent associated with the duplicate term, when the interpreted information input is included in the consolidated and reorganized information; and a response output generation portion that obtains from the selected interactive agent or the interactive agent corresponding to any of the identifiers of the conflicting interactive agents associated with the input information a response corresponding to the interpretation result of the input information, and generates response output data, wherein the recognition lexicon generation portion generates the recognition lexicon by selecting the accepted terms within a range that does not exceed a predetermined upper limit for the number of terms constituting the recognition lexicon.

4. The interactive control apparatus according to claim 3, wherein the recognition lexicon generation portion further obtains importances of the accepted terms from the interactive agents, and generates the recognition lexicon by selecting the accepted terms based on these importances.

5. The interactive control apparatus according to claim 3, wherein the recognition lexicon generation portion further obtains importances of the interactive agents, and generates the recognition lexicon by selecting the accepted terms based on these importances.

6. The interactive control apparatus according to claim 3, wherein the recognition lexicon generation portion further obtains usage frequencies of the interactive agents, and generates the recognition lexicon by selecting the accepted terms based on these usage frequencies.

7. The interactive control apparatus according to claim 3, wherein the recognition lexicon generation portion further obtains dates/times when the interactive agents have accepted the accepted terms, and generates the recognition lexicon by selecting the accepted terms based on these dates/times.

8. The interactive control apparatus according to claim 3, wherein the recognition lexicon generation portion generates deletion information associating terms that have not been selected as terms constituting the recognition lexicon with identifiers of interactive agents accepting those terms.

9. An interactive control method executed by an interactive control system that interacts with a plurality of interactive agents, the method executed by a computer, comprising:

interpreting by the computer, information input by a user, based on a recognition lexicon that has been generated in advance;

obtaining terms accepted by each of a plurality of interactive agents performing a response to a result interpreted by the input portion, regenerating the recognition lexicon by consolidating the accepted terms by excluding duplicate terms from the accepted terms, generating by the computer, separately from the recognition lexicon, consolidated and reorganized information associating the duplicate terms with identifiers of two or more conflicting interactive agents, which accepted the duplicate terms, performing, for each interaction, the obtaining of the accepted terms, and performing, for each interaction, the generation of the recognition lexicon and the consolidated and reorganized information;

selecting one of the interactive agents and assigning the input information to the selected interactive agent, when the interpreting interprets a word which exists only in the recognition lexicon and assigning the interpreted result of the input information to an interactive agent corresponding to any of the identifiers of the conflicting interactive agents associated with the input information based upon an importance given to each interactive agent, an importance given to the duplicate term, usage frequency of each interactive agent based upon historical data, and the most recent interactive agent associated with the duplicate term, when the interpreted information input is included in the consolidated and reorganized information; and obtaining from the selected interactive agent or the interactive agent corresponding to any of the identifiers of the conflicting interactive agents associated with the input information a response corresponding to the interpretation result of the input information, and generating by the computer response output data.

10. A computer-readable recording medium storing an interactive control program executed by an interactive control system that interacts with a plurality of interactive agents, the program executing:

interpreting information input by a user, based on a recognition lexicon that has been generated in advance;

obtaining terms accepted by each of a plurality of interactive agents performing a response to a result interpreted by the input portion, regenerating the recognition lexicon by consolidating the accepted terms by excluding duplicate terms from the accepted terms, generating, separately from the recognition lexicon, consolidated and reorganized information associating the duplicate terms with identifiers of two or more conflicting interactive agents, which accepted the duplicate terms, performing, for each interaction, the obtaining of the accepted terms, and performing, for each interaction, the generation of the recognition lexicon and the consolidated and reorganized information;

selecting one of the interactive agents and assigning the input information to the selected interactive agent, when the interpreting interprets a word which exists only in the recognition lexicon, and assigning the information input to an interactive agent corresponding to any of the identifiers of the conflicting interactive agents associated with the interpreted information input based upon an importance given to each interactive agent, an importance given to the duplicate term, usage frequency of each interactive agent based upon historical data, and the most recent interactive agent associated with the duplicate term, when the interpreted information input is included in the consolidated and reorganized information; and obtaining from the selected interactive agent or the interactive agent corresponding to any of the identifiers of the conflicting interactive agents associated with the input information a response corresponding to the interpretation result of the input information, and generating response output data.

* * * * *